(12) United States Patent
Miller et al.

(10) Patent No.: US 6,764,047 B2
(45) Date of Patent: Jul. 20, 2004

(54) MODEL AIRPLANE HINGE CONSTRUCTION

(76) Inventors: Todd Scott Miller, P.O. Box 7, Henderson, KY (US) 42420; Larry G. Barnes, 2121 Augusta St., Henderson, KY (US) 42420

( * ) Notice: Subject to any disclaimer, the term of this patent is extended or adjusted under 35 U.S.C. 154(b) by 0 days.

(21) Appl. No.: 09/770,923

(22) Filed: Jan. 26, 2001

(65) Prior Publication Data
US 2002/0100839 A1 Aug. 1, 2002

(51) Int. Cl.$^7$ .............................................. B64C 9/02
(52) U.S. Cl. ........................ 244/131; 446/66; 244/123
(58) Field of Search .......................... 244/123, 215, 244/131, 90 R, 213, 124, 49; 16/373, 385, 225; 416/230, 241 A, 23, 24; 446/359, 331, 119, 56, 57, 61, 66, 62

(56) References Cited

U.S. PATENT DOCUMENTS

| | | | | |
|---|---|---|---|---|
| 3,645,481 A | * | 2/1972 | Purdy | 244/123 |
| 3,699,708 A | | 10/1972 | Mabuchi | |
| 3,787,997 A | * | 1/1974 | Lemelson | 446/60 |
| 3,858,349 A | * | 1/1975 | McClendon | 244/123 |
| 3,871,126 A | * | 3/1975 | Miller | 446/32 |
| 4,578,888 A | * | 4/1986 | Gomez | 40/411 |
| 4,598,889 A | * | 7/1986 | Remington | 16/260 |
| 5,398,893 A | * | 3/1995 | Barker et al. | 16/225 |
| 5,573,204 A | | 11/1996 | Barker et al. | |
| 6,048,247 A | * | 4/2000 | Kownacki et al. | 446/4 |

* cited by examiner

Primary Examiner—Peter M. Poon
Assistant Examiner—Timothy D. Collins
(74) Attorney, Agent, or Firm—Liniak, Berenato & White, LLC

(57) ABSTRACT

A plurality of spaced apart, flexible string hinges pivotally join an airfoil of a model airplane to its corresponding flight control element. Such string hinges are shown in use for pivotally joining an aileron to a wing, a rudder to a tail fin and an elevator or flap to a horizontal stabilizer to permit rolling, yawing, and pitching movement, respectively, of the airplane when in flight. In one embodiment, a plurality of string hinges are connected by means of conventional airplane glue between a series of spaced apart blind holes formed in a leading edge portion of an aileron and similarly spaced apart reinforcing ribs of a wing. In another embodiment, a plurality of string hinges extend between blind holes formed in a solid balsa aileron and holes formed through a trailing edge spar of a wing and are secured at opposite ends by glue or epoxy. Examples of string hinges used to pivotally join a rudder to a tail fin and an elevator to a horizontal stabilizer in a model airplane are also disclosed.

17 Claims, 2 Drawing Sheets

MODEL AIRPLANE HINGE CONSTRUCTION

BACKGROUND OF THE INVENTION

This invention relates generally to means for pivotally joining a flight control element to a corresponding airfoil in a model airplane of fixed wing type and, more specifically to the pivotal joinder of the element to the airfoil by means of a plurality of flexible string hinges.

Broadly speaking, it has a long been known in the model airplane prior art to pivotally join flight control elements, such as ailerons, rudders and elevators, to their corresponding airfoils such as wings, vertical stabilizer fins and horizontal stabilizer members, respectively. One such prior art joinder means is a plurality of spaced apart flexible plastic hinge strips used to pivotally join an aileron to a wing in a model airplane as disclosed in U.S. Pat. No. 3,645,481 granted to L. R. Purdy on Feb. 29, 1972. Such flexible hinge strips are sometimes referred to as "live" hinges. In addition, hinges having a pair of plastic flaps joined together by a hinge pin have also been used in the prior art. Further, strips of flexible flat fabric have been used as hinges to adjoin model airplane airfoils to flight control surfaces. These hinges are inserted in elongated slots that oppose one another which are formed in a trailing edge of an airfoil and in a leading edge of a corresponding control element.

A problem that has been encountered using the previously mentioned prior art hinges is the difficulty in closely aligning pairs of opposing slots formed in a trailing edge of an airfoil and in an adjacent leading edge of a corresponding control element for insertion of the flat plastic or fabric hinge therein. If the opposing slot pairs are not closely aligned, the hinge either will not fit or, if forced to fit, will contain a bend or wrinkle therein which over time, can weaken the hinge joint to the point of breakage or failure or can adversely affect the range of motion of the control element relative to the corresponding airfoil or both. Also, if the opposing slots are not properly aligned, binding of a plastic hinge can occur which can severely affect the flight path of a model airplane even to the point of causing a crash.

By means of our invention, these and other difficulties encountered using conventional prior art hinge structure to join a model airplane airfoil to a corresponding flight control element are substantially overcome. The string hinges of my invention are easier to install, can not produce binding, are easier to align across the gap between an airfoil and its control member and are less prone to failure than is the case with conventional plastic or fabric hinges.

SUMMARY OF THE INVENTION

It is an object of our invention to provide a novel means for pivotally joining an airfoil to a flight control member in a model airplane.

Briefly, in accordance with our invention, there is provided, in a model airplane structure, means for pivotally connecting at least one flight control member to a corresponding airfoil. The means comprises a series of spaced apart, flexible string members tightly strung between the flight control member and the corresponding airfoil.

These and other objects, features and advantages of our invention will become apparent to those skilled in the art from the following detailed description and attached drawings upon which, by way of example, only a preferred and other important embodiments of our invention are illustrated.

DESCRIPTION OF THE PREFERRED EMBODIMENT

Figure 1:
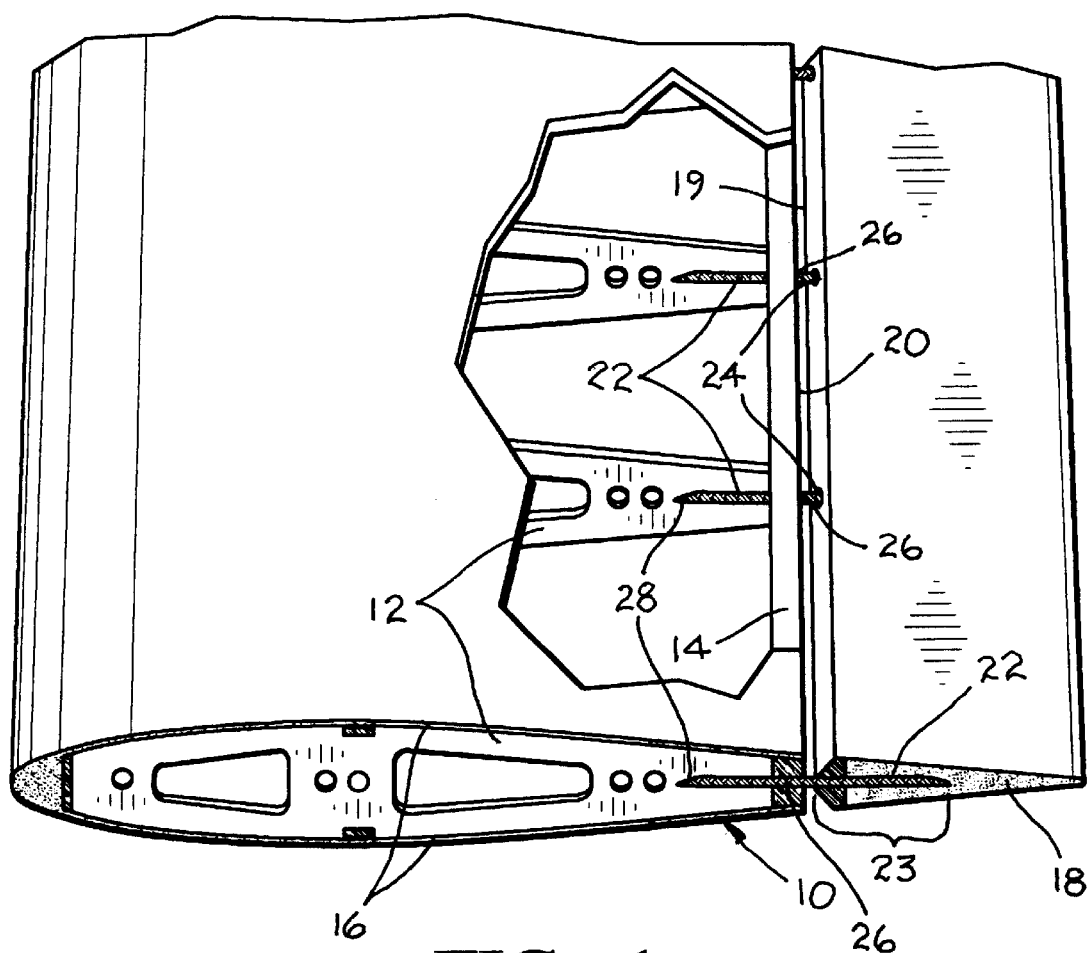
FIG. 1 shows an oblique view of a portion of an airfoil, such as a wing, and an attached flight control member, such as an aileron, of a flyable model airplane showing novel means for movably attaching the flight control member to reinforcing ribs of the airfoil, thus illustrating a preferred embodiment of the subject invention.

Referring now to the drawing figures and, in particular, to FIG. 1 there is shown, in a preferred embodiment of our invention, a portion of a model airplane wing, generally designated 10. The wing 10 is of conventional construction and includes a series of parallel extending, transversely spaced apart reinforcing ribs 12 attached on trailing edges by a suitable glue to a transversely extending trailing edge wing spar 14. A conventional load bearing skin member 16 is stretched over and covers upper and lower broad surfaces of the wing 10 as shown. In addition to providing rigidity to the wing 10, the ribs 12 give form to the skin member 16 so that the latter will provide the desired aerodynamic lifting surface for the model airplane when in flight. A conventional aileron 18 is joined to the wing 10 so that a leading edge thereof pivotally abuts a trailing edge 20 of the wing spar 14 and is tiltable on command relative to the wing for controlling rolling movement of the model airplane when in flight. Typically, the aileron 18 is a solid member made of an extremely light weight wood such as balsa. A conventional radio controlled servomotor, not shown, is mounted on a central body of the airplane and controls the usual mechanical linkages, also not shown, attached to the aileron 18 for controlling the tilting movement of the latter relative to the wing 10, all in a well known manner. The servomotor and its linkages to the aileron 18 need not be shown since they form no part of the present invention.

Now, in accordance with our invention, the aileron 18 is pivotally positioned along and against the trailing edge 20 and is attached to at least several of the wing ribs 12 by means of a series of flexible, spaced apart string hinges 22. Each of the string hinges 22 contains a trailing end portion which is inserted into and glued within a different blind hole 24 drilled in a leading edge portion of the aileron 18. Each of the blind holes 24 is aligned so as to extend parallel with but be slightly offset to one side of a different one of the wing ribs 12 when the aileron 18 is properly operatively positioned against the wing spar 14. A like series of spaced apart holes 26 is drilled through the wing spar 14 so as to closely align with the blind holes 24 when the aileron 18 is in its proper operative position. Thus, the holes 26 will be slightly offset to one side of different ones of the wing ribs 12. Leading end portions of the string hinges 22 which emerge from the blind holes 24 are then inserted through the holes 26 and are strung so as to extend along and against a broad side of the ribs 12 to and through holes 28 formed through the ribs. After the string hinges 22 are pulled tight so as to secure the leading edge of the aileron 18 against the wing spar 14, front end portions of the string hinges 22 which extend through the holes 20 are glued therein.

Any type of glue or epoxy sufficient to bond the string hinges 22 to wood defining the blind holes 24 and the rib holes 28 will be satisfactory such as, for example, the usual airplane glue found in many model airplane kits or that sold under the Trademark SUPERGLUE. There are a wide variety of strings that can be used for the string hinges 22 such as those having twisted, braided or woven fibers and those made of cotton, plastic, jute, hemp or metal fibers or otherwise but such string hinges 22 should have a tensile strength of 10 lb. or greater.

Figure 1A:
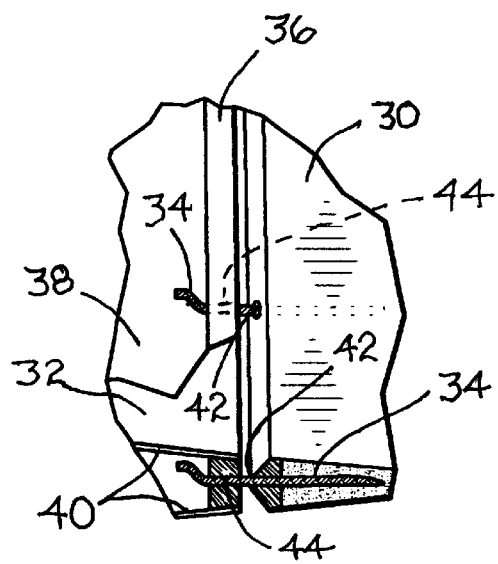
FIG. 1a shows an oblique view of a fragment of a wing and attached aileron of a flyable model airplane showing novel means for attaching the aileron to a trailing edge spar of the wing, thus illustrating another important embodiment of the present invention.

Referring now to FIG. 1a an alternative arrangement for pivotally securing a flight control member 30 to its corresponding airfoil 32 with a plurality of flexible string hinges 34 are of the same type as described in relation to hinges 22 of the previous example. The airfoil 32 may be a wing, horizontal stabilizer or vertical tail fin of a model airplane having a trailing edge spar 36. The airfoil 32 may contain spaced apart reinforcing ribs, such as, those shown at 12 in FIG. 1, or may simply contain a hollow interior 38 having a suitable covering 40. The flight control member 30 is typically a solid lightweight wooden body such as can be made from balsa, the same as in the previous example. Here, again, a series of transversely spaced apart blind holes 42 are drilled into a leading edge portion of the control member 30. A trailing end portion of each of the string hinges 34 is inserted into and glued within a different one of the blind holes 42. A like series of similarly spaced apart holes 44 are drilled through the spar 36 so as to align with the blind holes 42 when the control member 30 is in its operative position against the airfoil 32. Leading end portions of the string hinges 34 which extend out of the blind holes 42 are then strung through correspondingly aligned ones of the holes 42 and, after being pulled tight to position the member 30 against the spar 36, are glued within the holes 44.

Figure 2:
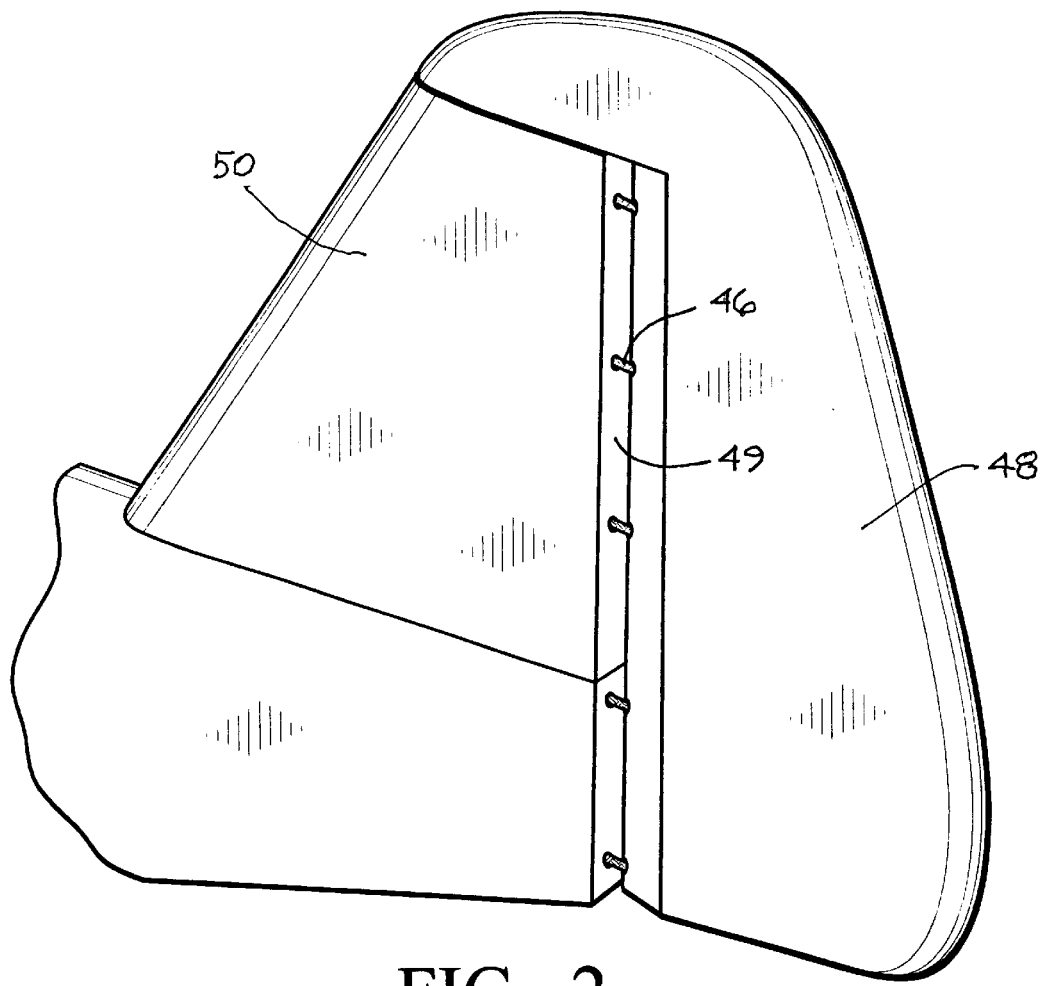
FIG. 2 shows a perspective view of a vertical stabilizer and tail portion of a flyable model airplane with a moveably attached rudder, thus illustrating yet another important embodiment of the instant invention.
Figure 3:
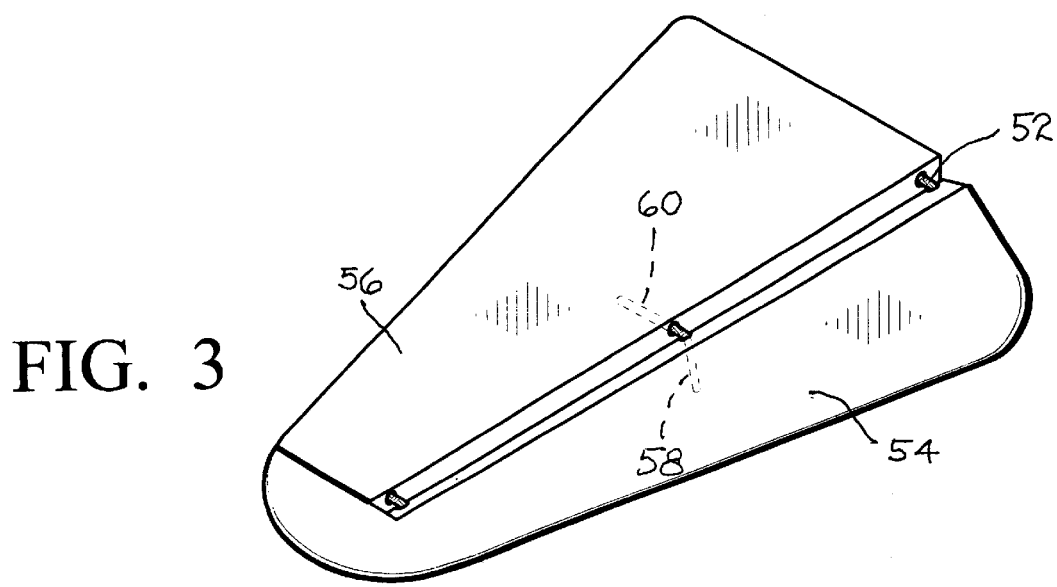
FIG. 3 shows a perspective view of a portion of a horizontal stabilizer of a flyable model airplane with a movably attached flap, thus illustrating still another important embodiment of our invention.

FIG. 2 shows a series of vertically spaced apart string hinges 46 used to pivotally join a rudder 48 to a vertical tail fin 50 of a model airplane for controlling motion of the airplane when in flight. The arrangement for connecting the hinges 46 between the rudder 48 and tail fin 50 may be the same as that shown in more detail in relation to the hinges 34 of FIG. 1a. FIG. 3 shows a plurality of horizontally spaced apart string hinges 52 connected between a flap 54 and a horizontal stabilizer 56 of a model airplane for controlling pitch of the airplane when in flight. In the example of FIG. 3 both the flap 54 and the stabilizer 56 may be constructed of a solid material such as balsa. In such a case, a trailing end portion of each of the string hinges 52 is inserted into and glued within a corresponding blind hole 58 drilled in a leading edge portion of the flap 54 and a leading end portion of the string hinges is inserted into and glued within a corresponding blind hole 60 drilled into a trailing edge portion of the stabilizer 56.

Although the present invention has been shown and described with respect to specific details of certain preferred embodiments, it is not intended that such details limit the scope or coverage of this patent other than as expressly set forth in the following claims, taking into consideration reasonable equivalents thereof.

We claim:

1. A model airplane structure, means for pivotally connecting at least one flight control member to a corresponding airfoil comprising a series of spaced apart, flexible hinges comprised of substantially cylindrical cable, each of said hinges being formed of a separate piece of said cable having one end connected to said flight control member and an opposite end connected to said airfoil, said cable hinges being tightly strung between said flight control member and said air foil such that each separate piece of said cable can only bend at one position between said flight control member and airfoil as said member and said airfoil pivot relative to one another.

2. The structure of claim 1 wherein each of said cable hinges extends between a different one of at least several reinforcing ribs of said airfoil and a parallel aligned blind hole formed in a leading edge portion of said corresponding flight control member.

3. The structure of claim 1 wherein each of said cable hinges extends between a different blind hole formed in said flight control member and an aligned hole formed through a trailing edge spar of said airfoil.

4. The structure of claim 1 wherein said flight control member comprises an aileron and said airfoil comprises a wing.

5. The structure of claim 1 wherein said flight control member comprises a rudder and said airfoil comprises a vertical tail fin.

6. The structure of claim 1 wherein said flight control member comprises an elevator and said airfoil comprises a horizontal stabilizer.

7. The structure of claim 1 wherein said cable hinges are secured to said flight control member and said airfoil by means of glue.

8. The structure of claim 1 wherein said cable hinges are secured to said flight control member and said airfoil by means of epoxy.

9. The structure of claim 1 wherein said cable hinges are selected from the group consisting essentially of cable made of cotton, plastic, jute, hemp and metal fiber which have a tensile strength of at least ten pounds.

10. A method for movably joining a flight control member to a support element of a corresponding airfoil in a model airplane, the steps of which comprise providing said flight control member and said corresponding airfoil; and pivotally joining said flight control member to said support element of said corresponding airfoil with a series of separate spaced apart, flexible string hinges, each of said hinges being constructed of a different piece string having a tensile strength of at least ten pounds; wherein said string can only bend at one position between said flight control member and airfoil as said member and said airfoil pivot relative to one another.

11. A method for movably joining a flight control member to a corresponding airfoil in a model airplane, the step of which comprise providing a flight control member constructed of a solid material;

providing an airfoil corresponding to said flight control member which contains a series of transversely spaced apart reinforcing ribs and a transversely extending trailing edge spar;

forming a series of spaced apart blind holes in a leading edge portion of said flight control member which are aligned parallel with but slightly offset to form a like series of said reinforcing ribs when said flight control member is operatively positioned against said airfoil;

forming a like series of holes through said trailing edge spar, each of said spar holes being aligned with a different one of said blind holes when said flight control member is operatively positioned against said airfoil;

forming a like series of holes through each of said reinforcing ribs which are slightly offset from said blind holes;

stringing a like series of flexible string hinges tightly between said blind holes, through said spar holes and alongside said reinforcing ribs to and through said rib holes;

gluing opposite end portions of each of said string hinges in a different one of said blind holes and a corresponding one of said rib holes when said string hinges are tightly strung between said blind holes and said rib holes and when said flight control member is operatively aligned against airfoil.

12. The method of claim 10 wherein said structural component is a trailing edge spar, said pivotally joining step further comprising forming a series of spaced apart blind holes in said flight control member;

forming a like series of spaced apart holes through said trailing edge spar which are aligned with said blind holes when said flight control member and airfoil are operatively positioned;

stringing said string hinges between said blind holes and said spar holes; and gluing opposite end portions of said string hinges in different aligned pairs of said blind holes and said spar holes.

13. In a model airplane structure, means for pivotally connecting at least one flight control member to a corresponding airfoil structural support component, said means comprising a series of spaced apart, flexible string hinges, each of said hinges being formed of a different and separate piece of string having opposite first and second end portions connected to said member and said airfoil structural support component, respectively, such that each of said separate pieces of string forming a different one of said hinges is tightly strung between said flight control member and said airfoil structural support component and can only bend at one position as said member and said airfoil pivot relative to one another.

14. In a model airplane structure, means for pivotally connecting at least one flight control member to a corresponding airfoil comprising a series of spaced apart, flexible string hinges tightly strung between said flight control member and said airfoil, wherein each of said string hinges extends between a different one of at least several reinforcing ribs of said airfoil and a parallel aligned blind hole formed in a leading edge portion of said corresponding flight control member.

15. In a model airplane structure, means for pivotally connecting at least one flight control member to a corresponding airfoil comprising a series of spaced apart, flexible string hinges tightly strung between said flight control member and said airfoil, wherein each of said string hinges extends between a different blind hole formed in said flight control member and an aligned hole formed through a trailing edge spar of said airfoil.

16. In a model airplane structure, means for pivotally connecting at least one flight control member to a corresponding airfoil comprising a series of spaced apart, flexible essentially cylindrical cable hinges strung between said flight control member and said airfoil, wherein said cable hinges are selected from the group consisting essentially of cable made of cotton, plastic, jute, hemp and metal fiber which have a tensile strength of at least ten pounds, wherein said cable can only bend at one position between said flight control member and airfoil as said member and said airfoil pivot relative to one another.

17. A method for movably joining a flight control member to a corresponding airfoil in a model airplane, the steps of which comprise providing said flight control element and said corresponding airfoil; and pivotally joining said flight control member to said corresponding airfoil with a series of spaced apart, flexible string hinges constructed of pieces of string having a tensile strength of at least ten pounds, said airfoil containing a trailing edge spar, said pivotally joining step further comprising, forming a series of spaced apart blind holes in said flight control member;

forming a like series of spaced apart holes through said trailing edge spar which are aligned with said blind holes when said flight control member and airfoil are operatively positioned;

stringing said string hinges between said blind holes and said spar holes; and gluing opposite end portions of said string hinges in different aligned pairs of said blind holes and said spar holes.

* * * * *